(12) United States Patent
Kim et al.

(10) Patent No.: US 9,347,524 B2
(45) Date of Patent: May 24, 2016

(54) TRANSMISSION FOR VEHICLE

(71) Applicant: Hyundai Motor Company, Seoul (KR)

(72) Inventors: Chon Ok Kim, Yongin-si (KR); Soon Ki Eo, Ansan-si (KR); Chae Hong Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/465,627

(22) Filed: Aug. 21, 2014

(65) Prior Publication Data

US 2015/0167786 A1 Jun. 18, 2015

(30) Foreign Application Priority Data

Dec. 18, 2013 (KR) ........................ 10-2013-0157918

(51) Int. Cl.
*F16H 3/08* (2006.01)
*F16H 3/093* (2006.01)

(52) U.S. Cl.
CPC ........ *F16H 3/093* (2013.01); *F16H 2003/0818* (2013.01); *F16H 2003/0931* (2013.01); *F16H 2200/0052* (2013.01); *Y10T 74/19228* (2015.01)

(58) Field of Classification Search
CPC . F16H 3/006; F16H 2003/0931; F16H 3/091; F16H 47/02
USPC .................................... 74/330, 331, 333, 340
See application file for complete search history.

(56) References Cited

U.S. PATENT DOCUMENTS

| 7,066,043 B2 * | 6/2006 | Kim et al. ........................ 74/330 |
| 7,340,973 B2 * | 3/2008 | Hiraiwa .......................... 74/330 |
| 8,561,494 B2 * | 10/2013 | Okadome et al. ............... 74/331 |
| 8,827,858 B2 * | 9/2014 | Rodgers, II ................... 475/218 |

FOREIGN PATENT DOCUMENTS

| JP | 2004-301139 A | 10/2004 |
| JP | 2005-186931 A | 7/2005 |
| JP | 2005-195115 A | 7/2005 |
| KR | 1996-0017247 A | 6/1996 |
| KR | 10-0229931 B1 | 8/1999 |
| KR | 10-2001-0066671 A | 7/2001 |
| KR | 10-0802712 B1 | 2/2008 |
| KR | 10-2009-0021575 A | 3/2009 |
| KR | 10-0897106 B1 | 5/2009 |

* cited by examiner

*Primary Examiner* — Ha D Ho
(74) *Attorney, Agent, or Firm* — Morgan, Lewis & Bockius LLP

(57) ABSTRACT

A transmission for a vehicle may include first and second input shafts, first and second output shafts, a first driving gear fixed to the second input shaft, a first medium gear engaged with the first driving gear and a second medium gear integrally connected to the first medium gear at least temporarily, and rotatably installed on the second output shaft, a third medium gear engaged with the second medium gear and rotatably installed on the second input shaft, a first stage driven gear engaged with the third medium gear and rotatably installed on the first output shaft, a second stage driving gear selectively rotatable with the first output shaft, a second stage driven gear installed on the second output shaft and engaged with the second stage driving gear, and an auxiliary clutch for selectively connecting the second stage driving gear to the first input shaft.

8 Claims, 3 Drawing Sheets

TRANSMISSION FOR VEHICLE

CROSS-REFERENCE(S) TO RELATED APPLICATION

The present application claims priority of Korean Patent Application Number 10-2013-0157918 filed on Dec. 18, 2013, the entire contents of which application is incorporated herein for all purposes by this reference.

BACKGROUND

1. Field of the Invention

The present invention relates to a transmission for a vehicle, and more particularly, to a technology for a transmission structure that can overcome a torque interruption phenomenon during gear shift while utilizing a synchronized gear type transmission mechanism.

2. Description of Related Art

A main problem in development of transmissions mounted to vehicles is to reduce the number of parts of a transmission, the weight, overall length, and volume of the transmission.

The volume of the transmission influences a mounting performance of the transmission to a vehicle, and the weight of the transmission is a factor that greatly influences a fuel ratio of the vehicle.

Meanwhile, the basic form of the present invention is a synchronized gear type transmission mechanism in which two transmission gears are engaged with each other to circumscribe each other and configured to transmit power through one of the transmission gears selected by a synchronizing unit.

The above-described synchronized gear type transmission essentially generates a torque interrupting phenomenon by which transmission of power is interrupted while a synchronizing unit is released from the previous gear shift and is coupled to a gear shift that will transmit power newly, which is a main cause of lowering a gear shift feeling. The lowering of the gear shift feeling due to the cause becomes a big problem in lower stages such as first to third stages but a driver tends to feel the phenomenon relatively less at a high speed.

FIG. 1 is a view showing a structure of a transmission that has been studied to overcome a disadvantage of a conventional synchronized gear type transmission. The transmission includes a first input shaft 500 for always receiving power from an engine, and a second input shaft 504 that is a hollow shaft surrounding an outer side of the first input shaft 500 such that the power of the engine can be transmitted through a first clutch 502. A second stage driving gear 506 is disposed in the first input shaft 500 to receive power through the second clutch 508, and the first, third, fourth, fifth, and sixth driving gears other than the second stage driving gear are disposed in the second input shaft 504. Thus, if the second clutch 508 is coupled while releasing the first clutch 502 when shifting a gear to the first stage and the second stage, the gear shift to the second stage can be performed without causing a torque interruption phenomenon, and if the first clutch 502 is coupled while releasing the second clutch 508 in a state in which the third stage synchronizing unit is coupled in advance even during the gear shift to the second stage and the third stage, a torque interruption phenomenon can be excluded.

For reference, FIG. 1 shows a flow of power through which a first stage output is formed in the transmission by a dotted arrow and shows a flow of power through which an R stage output is formed by a solid line.

However, in the transmission having the above-described structure, the second input shaft 504, including the first stage driving gear 510, is a hollow shaft and a diameter of the second input shaft 504 should be enlarged to a predetermined level to secure strength of the first stage driving gear 510. If the diameter of the first stage driving gear 510 becomes enlarged, both the diameter of the first stage driven gear 512 engaged with the first driving gear 510 and the distance between the first stage driven gear 512 and the first driving gear 510 should become enlarged to realize a desired first stage gear shift ratio, which causes the weight and volume of the transmission to increase significantly.

For reference, reference numeral 512 denotes a differential gear for distributing power to two driving wheels, reference numeral 516 denotes a first output shaft, reference numeral 518 denotes a second output shaft, and reference numeral 520 denotes a reverse idler shaft.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle by which mounting performance of the transmission to a vehicle can be improved and a fuel ratio of the vehicle can be improved by realizing a plurality of desired gear shift stages while preventing diameters of a driving gear and a driven gear from increasing, preventing a distance between shafts from increasing, and preventing the volume and weight of the transmission from increasing to secure a strength of the driving gear provided on a hollow shaft, and an excellent gear shift quality can be realized by overcoming a gear shift feeling lowering phenomenon due to a torque interruption phenomenon during gear shift.

In an aspect of the present invention, a transmission for a vehicle may include a first input shaft directly connected to an engine, a second input shaft that is a hollow shaft surrounding the first input shaft and being concentric to the first input shaft, and installed to be connected to the engine through a main clutch, a first output shaft and a second output shaft disposed in parallel to the second input shaft, a first driving gear fixed to the second input shaft, a complex medium gear having a first medium gear engaged with the first driving gear and a second medium gear integrally connected to the first medium gear at least temporarily, and rotatably installed on the second output shaft, a third medium gear engaged with the second medium gear and rotatably installed on the second input shaft, a first stage driven gear engaged with the third medium gear and rotatably installed on the first output shaft to form a first stage gear shift, a second stage driving gear selectively rotatable with the first output shaft, a second stage driven gear installed on the second output shaft to be engaged with the second stage driving gear so as to realize a second stage gear shift, and an auxiliary clutch for connecting the second stage driving gear to the first input shaft or interrupting the second stage driving gear from the first input shaft.

The first medium gear and the second medium gear of the complex medium gear are permanently and integrally connected to each other, and the first medium gear also serves as a third stage driven gear for forming a third stage gear shift together with the first driving gear.

A fifth stage driven gear engaged with the first driving gear to form a fifth stage gear shift is rotatably installed on the first output shaft, a second driving gear is integrally installed on the second input shaft, a fourth stage driven gear engaged with the second driving gear to form a fourth stage gear shift is rotatably installed on the second output shaft, and a sixth stage driven gear engaged with the second driving gear to form a sixth stage gear shift is rotatably installed on the first output shaft.

A third driving gear is integrally installed on the second input shaft, an R stage driven gear for realizing a reverse gear shift is installed on the first output shaft, and a reverse idler gear engaged with the third driving gear and the R stage driven gear is installed on an idler shaft to transmit reverse power.

A first and R stage synchronizing unit for connecting or releasing the first driven gear or the R stage driven gear to or from the first output shaft is installed between the first stage driven gear and the R stage driven gear of the first output shaft, wherein a third and fourth stage synchronizing unit for connecting or releasing the third stage driven gear or the fourth stage driven gear to or from the second output shaft is installed between the third stage driven gear and the fourth stage driven gear of the second output shaft, and wherein a fifth and sixth stage synchronizing unit for connecting or releasing the fifth stage driven gear or the sixth stage driven gear to or from the first output shaft is installed between the fifth stage driven gear and the sixth stage driven gear of the first output shaft.

The complex medium gear is configured such that the first medium gear and the second medium gear are interrupted from or connected to each other by a medium synchronizing unit, and the first medium gear also serves as a third stage driven gear for forming a third stage gear shift together with the first driving gear.

A second driving gear is installed on the second input shaft, a fourth stage driven gear engaged with the second driving gear to form a fourth stage gear shift is rotatably installed on the first output shaft, wherein a fifth stage driven gear engaged with the second driving gear to form a fifth stage gear shift is rotatably installed on the second output shaft, wherein an R stage driven gear for forming a reverse gear shift is rotatably installed on the first output shaft, and wherein a reverse idler gear engaged with the first driving gear along with the R stage driven gear is installed on the idler shaft to transmit reverse power.

A fourth and R stage synchronizing unit for connecting or releasing the fourth driven gear or the R stage driven gear to or from the first output shaft is installed between the fourth stage driven gear and the R stage driven gear of the first output shaft, wherein a third and fifth stage synchronizing unit for connecting or releasing the third stage driven gear or the fifth stage driven gear to or from the second output shaft is installed between the third stage driven gear and the fifth stage driven gear of the second output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
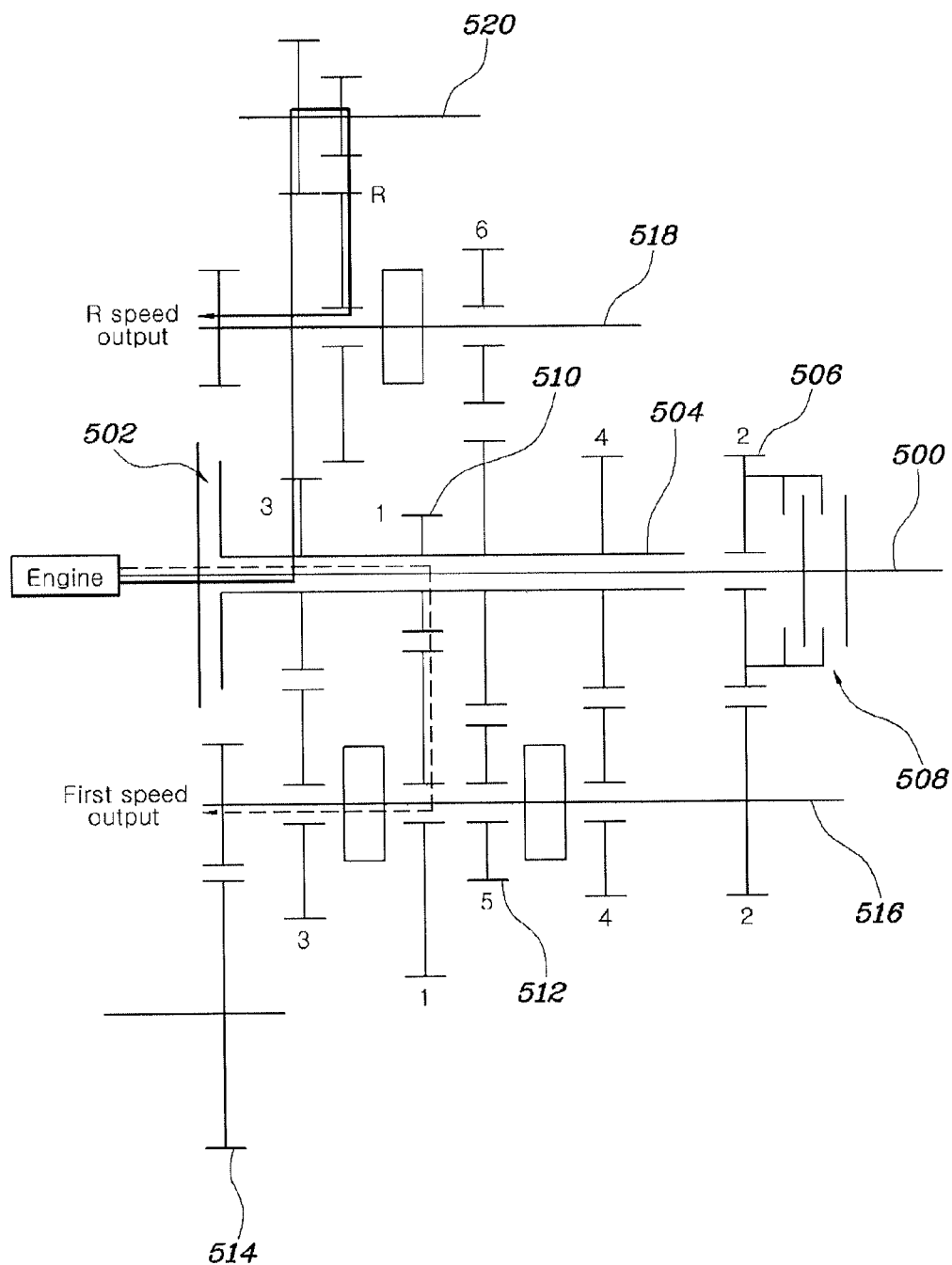
FIG. 1 is a view showing a structure of a transmission that has been studied to overcome the disadvantage of a conventional synchronized gear type transmission.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
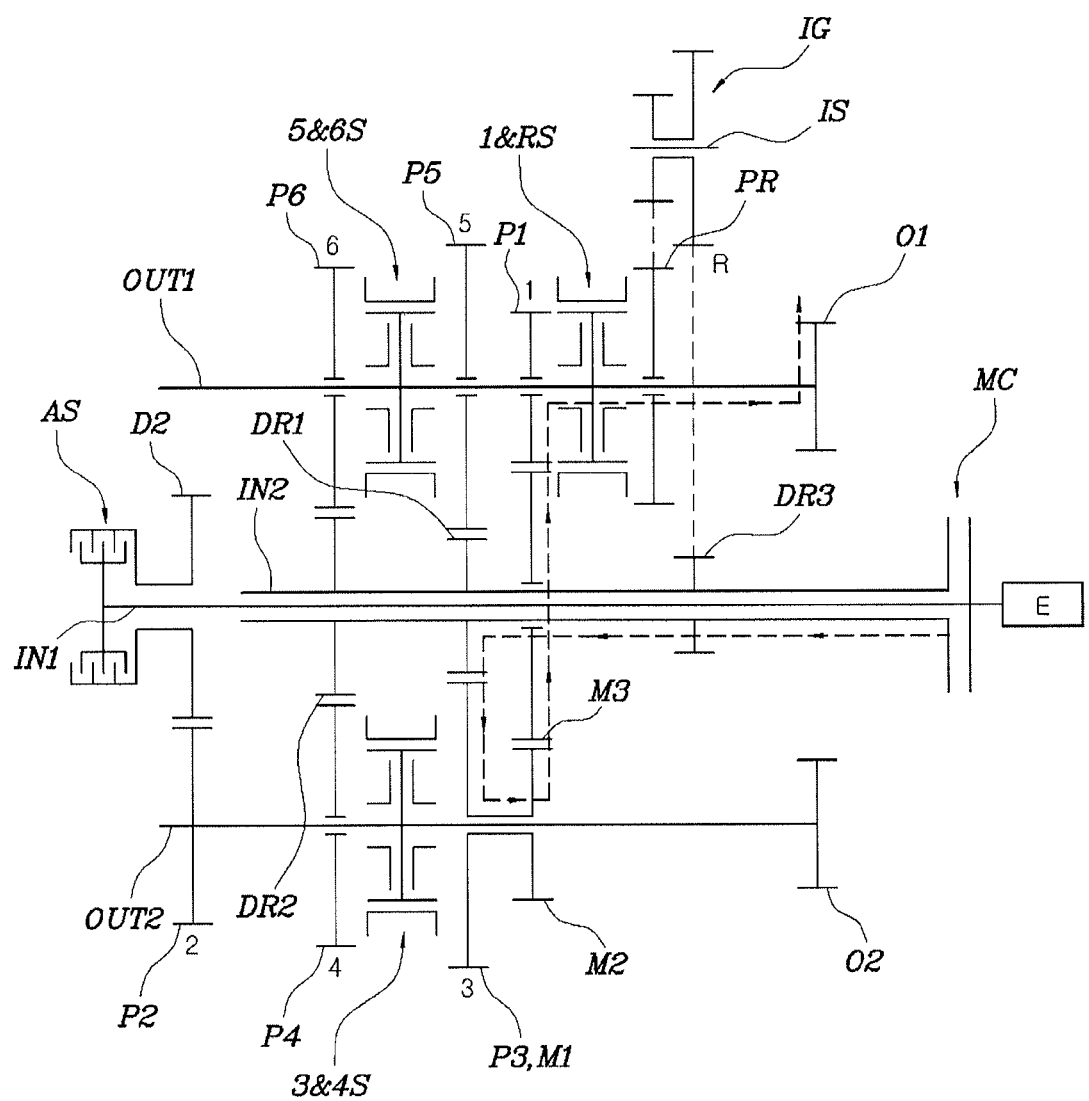
FIG. 2 is a view showing a transmission for a vehicle according to various exemplary embodiments of the present invention.
Figure 3:
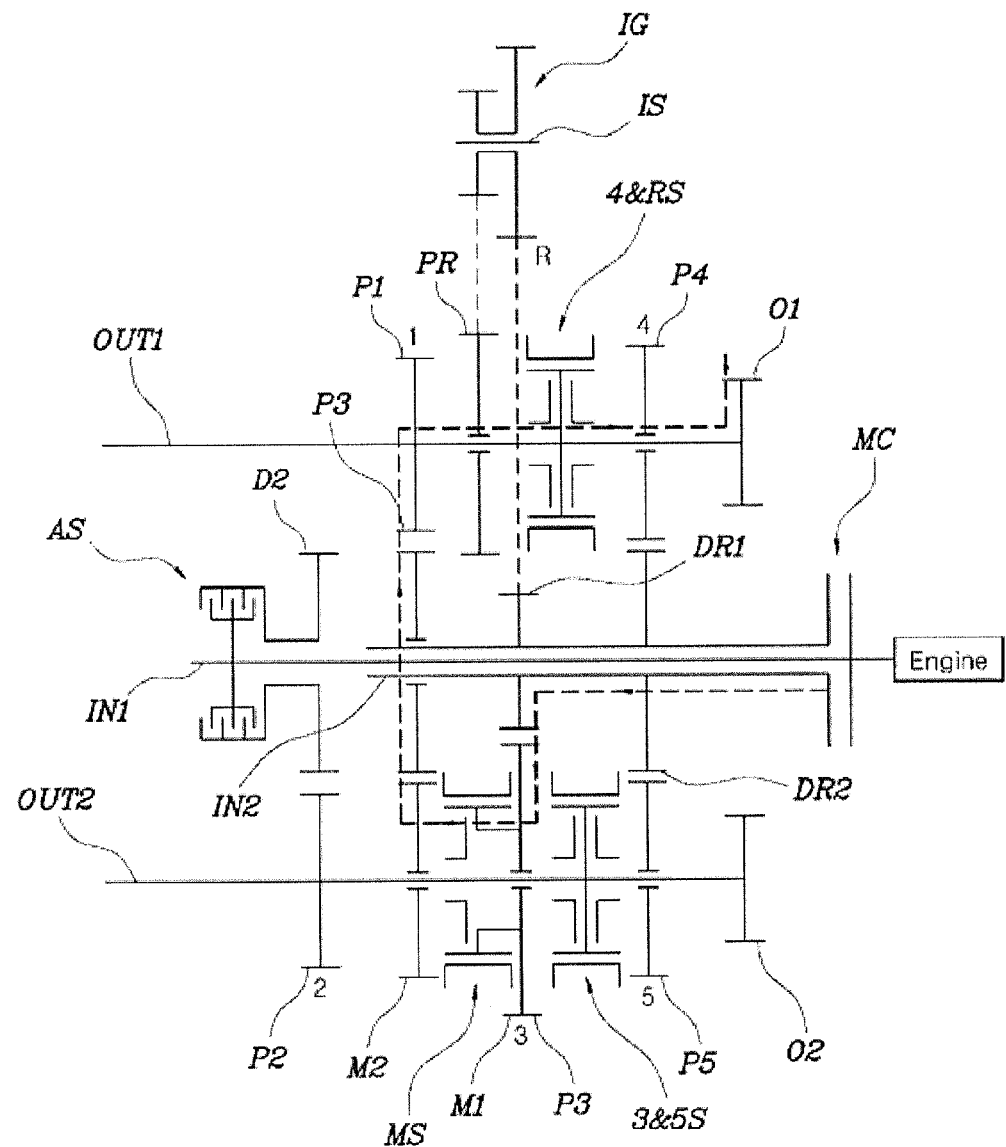
FIG. 3 is a view showing a transmission for a vehicle according to various exemplary embodiments of the present invention.

Referring to FIGS. 2 and 3, a transmission for a vehicle according to exemplary embodiments of the present invention includes: a first input shaft IN1 directly connected to an engine E, a second input shaft IN2 that is a hollow shaft surrounding the first input shaft IN1 and being concentric to the first input shaft, and installed to be connected to the engine through a main clutch MC, a first output shaft OUT1 and a second output shaft OUT2 disposed in parallel to the second input shaft IN2, a first driving gear DR1 fixed to the first input shaft IN1, a complex medium gear MG having a first medium gear M1 engaged with the first driving gear DR1 and a second medium gear M2 integrally connected to the first medium gear M1 at least temporarily, and rotatably installed on the second output shaft OUT2, a third medium gear M3 engaged with the second medium gear M2 and rotatably installed on the second input shaft IN2, a first stage driven gear P1 engaged with the third medium gear M3 and rotatably installed on the first output shaft OUT1 to form a first stage gear shift, a second stage driving gear D2 rotatably installed on the first input shaft IN1, a second stage driven gear P2 installed on the second output shaft OUT2 to be engaged with the second stage driving gear D2 so as to realize a second stage gear shift, and an auxiliary clutch AS for connecting the second stage driving gear D2 to the first input shaft IN1 or interrupting the second stage driving gear D2 from the first input shaft IN1.

That is, according to the exemplary embodiments of the present invention, in order to realize a first stage gear shift, a first stage gear ratio is realized by a gear train composed of the first driving gear DR1, the first medium gear M1, the second medium gear M2, the third medium gear M3, and the first stage driven gear P1. Since a size of the first driving gear DR1 and a size of the first stage driven gear P1 are not directly restricted by each other but a first stage gear ratio is realized by utilizing the first medium gear M1 to the third medium gear M3, a size of the first stage driven gear P1 may not be enlarged even if the first driving gear DR1 has a sufficient strength. Thus, since a distance between the second input shaft IN2 and the first output shaft OUT1 may not increase as in the related art, the weight and volume of the transmission can be reduced.

In a first exemplary embodiment of FIG. 2, the first medium gear M1 and the second medium gear M2 of the complex medium gear MG are permanently integrally connected to each other, and the first medium gear M1 also serves as a third stage driven gear P3 for forming a third stage gear shift together with the first driving gear DR1.

Here, the fact that the second medium gear M2 constituting the complex medium gear MG is integrally connected to the first medium gear M1 at least temporarily means that the second medium gear M2 is always integrally connected to the first medium gear M1 in the first embodiment and the second medium gear M2 may be integrally connected to or released from the first medium gear M1 by a medium synchronizing unit MS.

Meanwhile, in the first embodiment, a fifth stage driven gear P5 engaged with the first driving gear DR1 to form a fifth stage gear shift is rotatably installed on the first output shaft OUT1, a second driving gear DR2 is integrally installed on the second input shaft IN2, a fourth stage driven gear P4 engaged with the second driving gear DR2 to form a fourth stage gear shift is rotatably installed on the second output shaft OUT2, and a sixth stage driven gear P6 engaged with the second driving gear DR2 to form a sixth stage gear shift is rotatably installed on the first output shaft OUT1 so that a total of six forward shifts can be implemented.

Meanwhile, a third driving gear DR3 is integrally installed on the second input shaft IN2, an R stage driven gear PR for realizing a reverse gear shift is installed on the first output shaft OUT1, and a reverse idler gear IG engaged with the third driving gear DR3 and engaged with the R stage driven gear PR is installed on an idler shaft IS to transmit reverse power.

A first and R stage synchronizing unit 1 &RS for connecting or releasing the first driven gear P1 or the R stage driven gear PR to or from the first output shaft OUT1 is installed between the first stage driven gear P1 and the R stage driven gear PR of the first output shaft OUT1, a third and fourth stage synchronizing unit 3&4S for connecting or releasing the third driven gear P3 or the fourth driven gear P4 to or from the second output shaft OUT2 is installed between the third stage driven gear P3 and the fourth stage driven gear P4 of the second output shaft OUT2, and a fifth and sixth stage synchronizing unit 5&6S for connecting or releasing the fifth driven gear P5 or the sixth driven gear P6 to or from the first output shaft OUT1 is installed between the fifth stage driven gear P5 and the sixth stage driven gear P6 of the first output shaft OUT1.

A first output gear O1 is installed on the first output shaft OUT1 and a second output gear O2 is installed on the second output shaft OUT2 such that the first output gear O1 and the second output gear O2 are engaged with each other by a common differential gear to extract power to a driving wheel.

In the first embodiment of FIG. 2, as indicated by a dotted arrow, rotating power transmitted by the second input shaft IN2 is extracted to the first output gear O1 through the first driving gear DR1, the first medium gear M1, the second medium gear M2, the third medium gear M3, and the first stage driven gear P1 while the main clutch is coupled.

When the first stage gear shift state is shifted to the second stage gear shift state, torque from the engine is gradually extracted to the second output gear O2 through the second output shaft OUT2 via the second stage driving gear DR2, the second stage driven gear P2 as the auxiliary clutch AS is slipped to be coupled and the main clutch MC is slipped to be released, and the first and R stage synchronizing unit 1 &RS is released, and thereby the gear shift to the second stage is completed, in which case output torque is consistently applied to the driving wheel during this process to prevent an interruption of torque and secure an excellent gear shift feeling.

Meanwhile, when a second stage state is shifted to a third stage state, the main clutch MC is slipped to be coupled and the auxiliary clutch AS is slipped to be released while the third driven gear P3 is connected to the second output shaft OUT2 by the third and fourth stage synchronizing unit 3&4S. Thus, a gear shift to the third stage is completed while excluding a torque interruption phenomenon.

For reference, the gear shift to the remaining fourth to sixth stages is performed by releasing a synchronizing unit of the previous gear shift while the engine clutch is released as in a conventional synchronized gear type transmission mechanism, coupling a synchronizing unit of a new target gear shift, and then coupling the main clutch MC again.

Thus, although the torque interruption phenomenon of a driving wheel is essentially generated in the gear shift process of the fourth to sixth stages, the lowering of a gear shift feeling due to the torque interruption phenomenon is not severely felt during high gear shift stages corresponding to a relatively high speed driving situation of the vehicle. Thus, the gear shift feeling of a vehicle is felt to be significantly improved.

Meanwhile, in the second embodiment of FIG. 3, the complex medium gear MG is configured such that the first medium gear M1 and the second medium gear M2 are interrupted from or connected to each other by a medium synchronizing unit MS, and the first medium gear M1 also serves as a third stage driven gear P3 for forming a third stage gear shift together with the first driving gear DR1.

In the exemplary embodiment of the present invention, a second driving gear DR2 is installed on the second input shaft IN2, a fourth stage driven gear P4 engaged with the second driving gear DR2 to form a fourth stage gear shift is rotatably installed on the first output shaft OUT1, a fifth stage driven gear P5 engaged with the second driving gear DR2 to form a fifth gear shift is rotatably installed on the second output shaft OUT2, an R stage driven gear PR for forming a reverse gear shift is rotatably installed on the first output shaft OUT1, and a reverse idler gear IG engaged with the first driving gear DR1 and engaged with the R stage driven gear PR is installed on the idler shift IS to transmit reverse power.

A fourth and R stage synchronizing unit 4&RS for connecting or releasing the fourth driven gear P4 or the R stage driven gear PR to or from the first output shaft OUT1 is installed between the fourth stage driven gear P4 and the R stage driven gear PR of the first output shaft OUT1, and a third and fifth stage synchronizing unit 3&5S for connecting or releasing the third driven gear P3 or the fifth stage driven gear P5 to or from the second output shaft OUT2 is installed between the third stage driven gear P3 and the fifth stage driven gear P5 of the second output shaft OUT2.

In the exemplary embodiment of the present invention, the first stage is realized by coupling the first medium gear M1 also serving as the third stage driven gear P3 and the second medium gear M2 as the medium synchronizing unit MS, and the power transmission path is indicated by a dotted arrow in FIG. 3.

Another gear shift operation will not be described in detail since it follows the same principle as the first embodiment of FIG. 2.

According to an exemplary embodiment of the present invention, the mounting performance of the transmission to a vehicle can be improved and a fuel ratio of the vehicle can be improved by realizing a plurality of desired gear shift stages while preventing the volume and weight of the transmission from increasing due to the enlargement of diameters of a driving gear and a driven gear and the increase of a distance between shafts to secure a strength of the driving gear provided on a hollow shaft, and an excellent gear shift quality can be realized by overcoming a gear shift feeling lowering phenomenon due to a torque interruption phenomenon during gear shifting.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle comprising:
   a first input shaft directly connected to an engine;
   a second input shaft that is a hollow shaft surrounding the first input shaft and being concentric to the first input shaft, and installed to be connected to the engine through a main clutch;
   a first output shaft and a second output shaft disposed in parallel to the second input shaft;
   a first driving gear fixed to the second input shaft;
   a complex medium gear having a first medium gear engaged with the first driving gear and a second medium gear integrally connected to the first medium gear at least temporarily, and rotatably installed on the second output shaft;
   a third medium gear engaged with the second medium gear and rotatably installed on the second input shaft;
   a first stage driven gear engaged with the third medium gear and rotatably installed on the first output shaft to form a first stage gear shift;
   a second stage driving gear selectively rotatable with the first input shaft;
   a second stage driven gear installed on the second output shaft to be engaged with the second stage driving gear so as to realize a second stage gear shift; and
   an auxiliary clutch for connecting the second stage driving gear to the first input shaft or interrupting the second stage driving gear from the first input shaft.

2. The transmission of claim 1, wherein the first medium gear and the second medium gear of the complex medium gear are permanently and integrally connected to each other, and the first medium gear also serves as a third stage driven gear for forming a third stage gear shift together with the first driving gear.

3. The transmission of claim 2, wherein a fifth stage driven gear engaged with the first driving gear to form a fifth stage gear shift is rotatably installed on the first output shaft, a second driving gear is integrally installed on the second input shaft, a fourth stage driven gear engaged with the second driving gear to form a fourth stage gear shift is rotatably installed on the second output shaft, and a sixth stage driven gear engaged with the second driving gear to form a sixth stage gear shift is rotatably installed on the first output shaft.

4. The transmission of claim 3, wherein a third driving gear is integrally installed on the second input shaft, an R stage driven gear for realizing a reverse gear shift is installed on the first output shaft, and a reverse idler gear engaged with the third driving gear and the R stage driven gear is installed on an idler shaft to transmit reverse power.

5. The transmission of claim 4,
   wherein a first and R stage synchronizing unit for connecting or releasing the first stage driven gear or the R stage driven gear to or from the first output shaft is installed between the first stage driven gear and the R stage driven gear of the first output shaft,
   wherein a third and fourth stage synchronizing unit for connecting or releasing the third stage driven gear or the fourth stage driven gear to or from the second output shaft is installed between the third stage driven gear and the fourth stage driven gear of the second output shaft, and
   wherein a fifth and sixth stage synchronizing unit for connecting or releasing the fifth stage driven gear or the sixth stage driven gear to or from the first output shaft is installed between the fifth stage driven gear and the sixth stage driven gear of the first output shaft.

6. The transmission of claim 1, wherein the complex medium gear is configured such that the first medium gear and the second medium gear are interrupted from or connected to each other by a medium synchronizing unit, and the first medium gear also serves as a third stage driven gear for forming a third stage gear shift together with the first driving gear.

7. The transmission of claim 6,
   wherein a second driving gear is installed on the second input shaft, a fourth stage driven gear engaged with the second driving gear to form a fourth stage gear shift is rotatably installed on the first output shaft,
   wherein a fifth stage driven gear engaged with the second driving gear to form a fifth stage gear shift is rotatably installed on the second output shaft,
   wherein an R stage driven gear for forming a reverse gear shift is rotatably installed on the first output shaft, and
   wherein a reverse idler gear engaged with the first driving gear along with the R stage driven gear is installed on the idler shift to transmit reverse power.

8. The transmission of claim 7,
   wherein a fourth and R stage synchronizing unit for connecting or releasing the fourth driven gear or the R stage driven gear to or from the first output shaft is installed between the fourth stage driven gear and the R stage driven gear of the first output shaft, and
   wherein a third and fifth stage synchronizing unit for connecting or releasing the third stage driven gear or the fifth stage driven gear to or from the second output shaft is installed between the third stage driven gear and the fifth stage driven gear of the second output shaft.

\* \* \* \* \*